(12) United States Patent
McDonald

(10) Patent No.: US 6,532,280 B1
(45) Date of Patent: Mar. 11, 2003

(54) INTEGRATED CIRCUIT CARD FOR COMPUTER COMMUNICATION

(75) Inventor: Michael R. McDonald, Sunnyvale, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/561,194

(22) Filed: Apr. 27, 2000

(51) Int. Cl.⁷ .............................................. H04M 11/00
(52) U.S. Cl. .................... 379/93.05; 379/93.08
(58) Field of Search .................... 379/93.05, 93.08, 379/90.01, 167.01, 167.02, 167.11, 167.13, 167.14; 370/480, 487, 485, 488, 493, 464; 375/219, 220

(56) References Cited

U.S. PATENT DOCUMENTS

| | | | |
|---|---|---|---|
| 5,841,841 A | * 11/1998 | Dodds et al. | 379/93.08 |
| 5,848,150 A | 12/1998 | Bingel | |
| 5,889,856 A | 3/1999 | O'Toole et al. | |
| 5,909,445 A | 6/1999 | Schneider | |
| 5,960,066 A | * 9/1999 | Hartmann et al. | 379/93.08 |
| 6,298,037 B1 | * 10/2001 | Sharifi | 370/210 |
| 6,393,050 B1 | * 5/2002 | Liu | 375/219 |
| 6,393,111 B1 | * 5/2002 | Ripy et al. | 379/93.05 |

OTHER PUBLICATIONS

The Home Phoneline Networking Alliance, "Simple, High-Speed Ethernet Technology for the Home", Jun. 1998, Online <URL: http://www.homepna.org/docs/wp1.pdf>.

* cited by examiner

Primary Examiner—Stella Woo
(74) Attorney, Agent, or Firm—Fish & Richardson P.C.

(57) ABSTRACT

An interface circuit for allowing a computer system to communicate over existing household wiring in multiple frequency bands. The interface circuit includes an isolation circuit that connects the interface circuit to the household wiring. An analog-to-digital/digital-to-analog converter receives analog signals in multiple frequency bands and digitizes them. A digital splitter/combiner operates to filter the combined frequency digital signals received from the analog-to-digital/digital-to-analog converter. The frequency bands preferably comprise a voice band typically used for transmitting voice telephone signals, a DSL band for transmitting and receiving high-speed digital data over a twisted pair of telephone wires, and a Home PNA frequency band used for networking computers and peripherals on a twisted pair of telephone wires. The digital splitter/combiner feeds circuits designed to transmit and receive data in each of these frequency bands so that the computer system can transmit and receive data on whatever band is available.

8 Claims, 2 Drawing Sheets

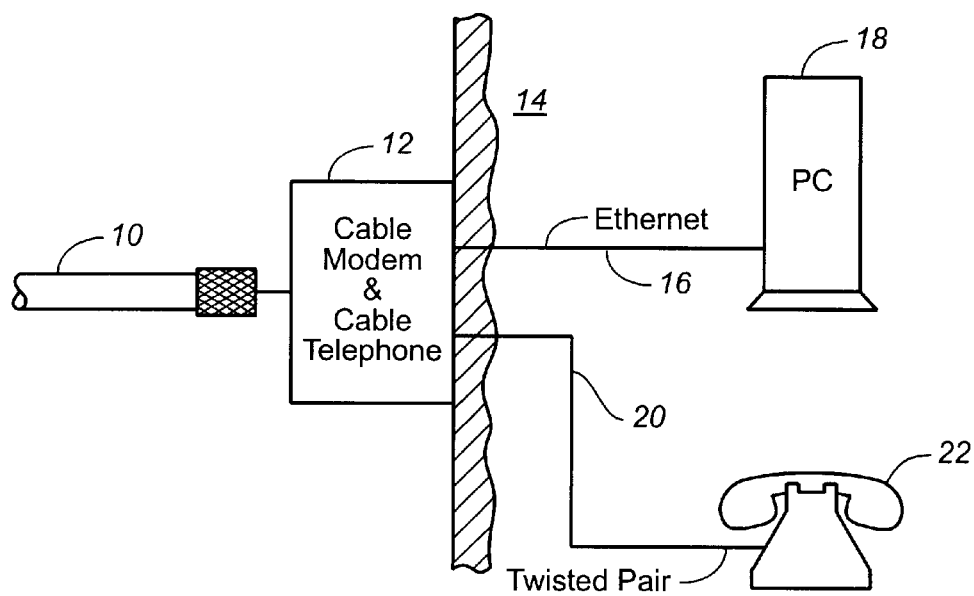
FIG._1 (PRIOR ART)
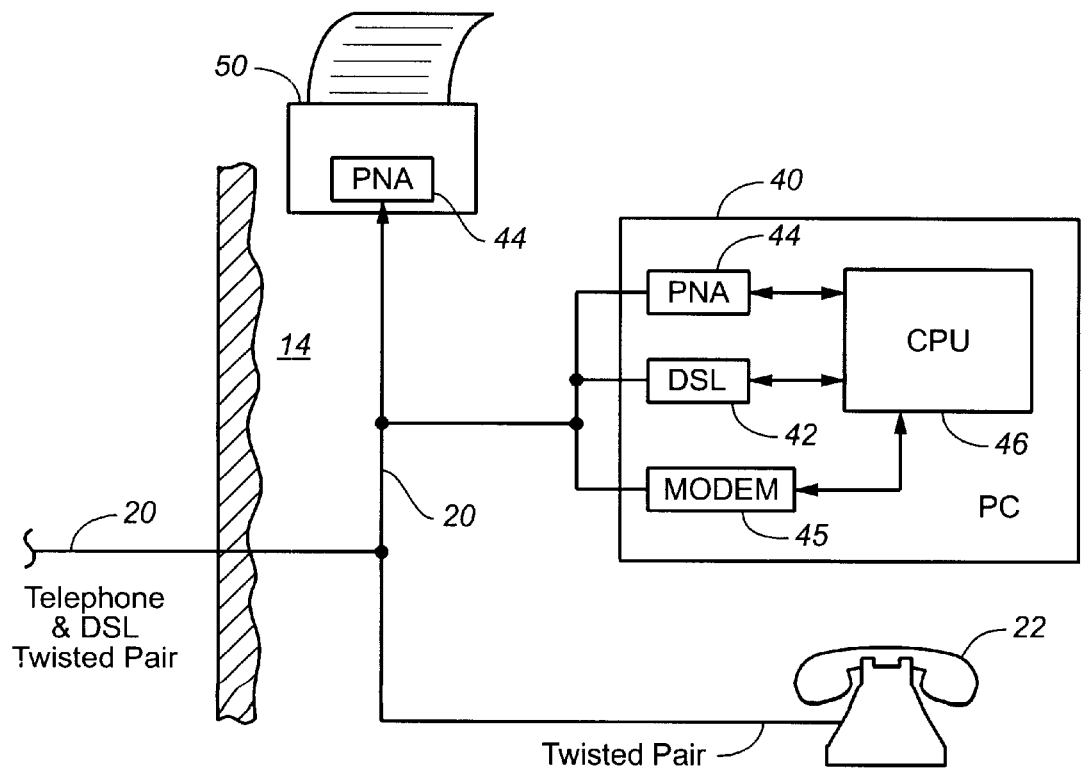
FIG._2 (PRIOR ART)

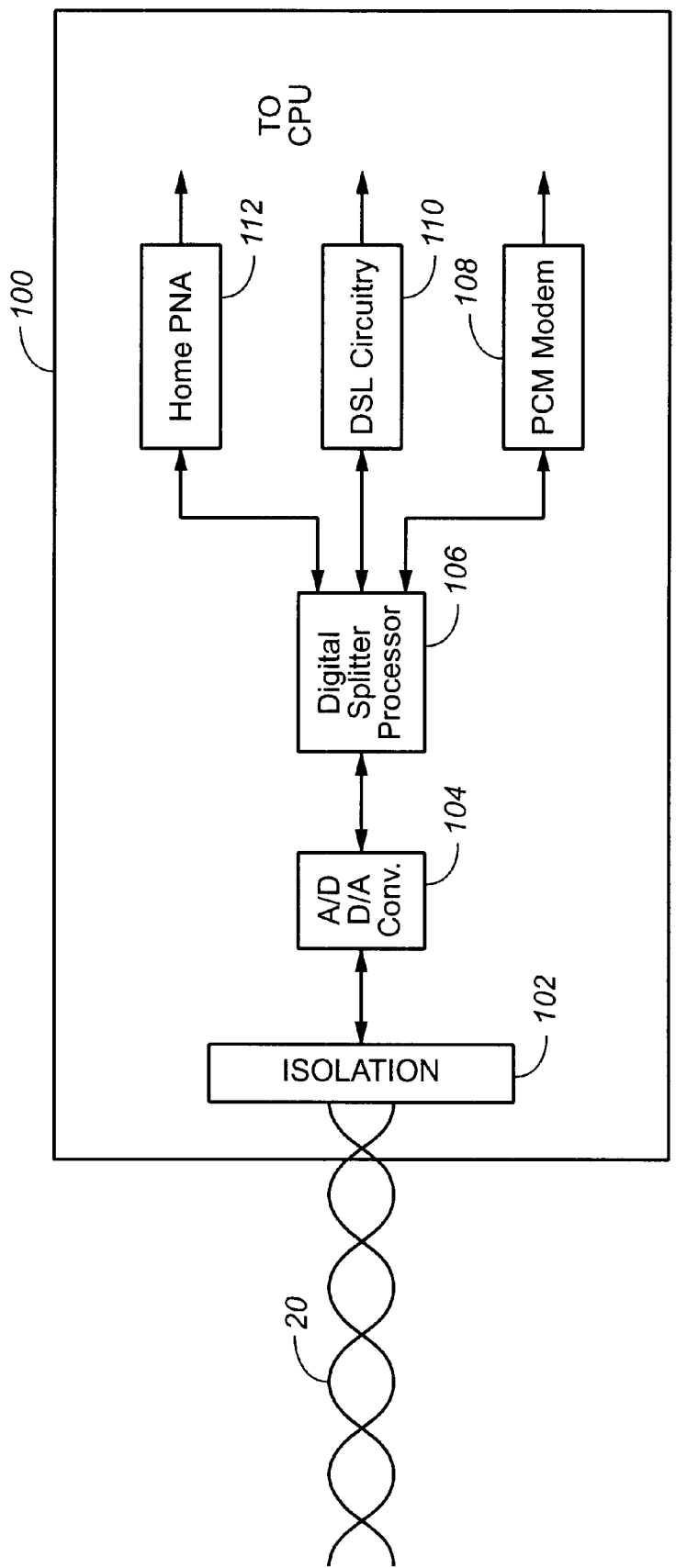
FIG._3

INTEGRATED CIRCUIT CARD FOR COMPUTER COMMUNICATION

FIELD OF THE INVENTION

The present invention relates to communication systems in general, and in particular to computer communication systems.

BACKGROUND OF THE INVENTION

Despite the fact that a majority of individuals in the United States have access to one or more personal computers, most residences are not wired to take advantage of the high-speed communication or resource sharing capabilities of such computers. Most computer-to-computer or computer-to-peripheral communications take place over high-speed networking cables not found in most residences. As an alternative to rewiring existing homes with high-speed cables such as Ethernet, a standardized high-speed data transfer protocol called Home PNA is jointly being developed by companies such as 3Com, AMD, ATT, Compaq, Conexant, IBM, Intel, and Lucent. Home PNA allows computer systems to transmit and receive high-speed digital data over the existing telephone wires which are generally routed throughout a residence. Home PNA signals are transmitted in a frequency band that extends from 5.5–9.5 MHz in order to avoid conflict with other signals, such as DSL or voice signals, that may be simultaneously transmitted on the telephone wiring.

In the past, if a user wanted to be able to transmit and receive data from their computer, the computer had to be equipped with multiple interface cards. One card may be an analog modem for transmitting and receiving data in the voice band of a conventional telephone circuit. A DSL card is required to transmit and receive high-speed digital data on a set of telephone wires. Finally, to transmit and receive data on a Home PNA network, yet another interface card is required. Each of these cards typically includes an arrangement of filters that isolate data signals in a particular frequency band. The filters are primarily comprised of a number of analog components that are expensive to manufacture and align. To reduce the redundancy associated with having more than one individual interface card, there is a need for a single interface card that can facilitate transmitting and receiving digital data in a number of different frequency bands without the need for complex analog filter components.

SUMMARY OF THE INVENTION

The present invention is a single interface card that allows a computer to transmit and receive digital data in a number of frequency bands without the use of analog filter components. To transmit and receive data on conventional household telephone wiring, the interface card includes an isolation circuit that couples signals from the telephone wiring to the interface card. The output of the isolation circuit feeds a single analog-to-digital/digital-to-analog (AtoD/DtoA) converter. The output of the AtoD/DtoA converter feeds a digital splitter/combiner that utilizes digital signal processing or discrete digital logic to filter digital data into multiple frequency domains. Signals in a voice band from 0.1–4 kHz are supplied by the digital splitter/combiner to a PCM modem. Signals in the 85–500 kHz range are supplied to DSL circuitry. In addition, digital signals in the 5.5–9.5 MHz range are supplied by the digital splitter/combiner to Home PNA circuitry. The digital splitter/combiner allows a single card to be created with few or no analog filter components, as well as eliminates the need for multiple separate integrated circuits for processing each of the different frequency bands.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 illustrates a conventional method of providing high-speed data to a residence wired with a cable modem;

FIG. 2 illustrates the multiple interface cards required to allow a computer to transmit and receive DSL and Home PNA signals over existing telephone wiring; and FIG. 3 illustrates an interface card that allows a computer to transmit and receive digital data in a conventional telephone voice band, DSL frequency or Home PNA frequency band according to the present invention.

DETAILED DESCRIPTION OF THE DRAWINGS

As indicated above, the present invention is an interface card for allowing a computer system to receive high-speed digital data from conventional telephone wiring without unnecessary and bulky analog filter components.

FIG. 1 illustrates one conventional method of delivering high-speed digital data and telephone signals to a residence. Telephone signals and digital data are supplied on a data carrying line 10 which typically comprises a hybrid fiber optic and coaxial cable. The cable terminates at a junction box 12 located at a residence 14. The junction box 12 includes a cable modem (not shown) that routes high-speed digital data over an Ethernet cable 16 to a computer system 18. In addition, the junction box 12 includes a telephone interface circuit (not shown) that powers a telephone 22 and generates the appropriate ringing signals, dial tone, etc. The telephone interface circuit supplies the telephone signals on a conventional set of twisted telephone wires 20. As indicated above, one of the primary factors that inhibit the many computer users from receiving higher speed digital data is the fact that their house, apartment, townhouse, etc., is not wired with the high-speed Ethernet cable 16. Therefore, these cables must be specially installed by an Internet service provider, cable operator, or other technician thereby increasing the expense associated with receiving higher speed digital data.

FIG. 2 illustrates another conventional method by which residences receive high-speed digital data. Many phone companies provide telephone signals and high-speed digital data on conventional twisted pair telephone lines using digital subscriber line (DSL) technology. The DSL data signals are typically transmitted in a frequency band which is separated from the frequency band occupied by the telephone voice signals so that the digital data can be separated from the voice data and supplied to a computer system. The advantage of DSL networks is that the data can be routed throughout a residence using the existing telephone wiring.

In order to provide networking capabilities to home users without the installation of dedicated networking cables, a new technology called Home PNA, which was developed by various companies including 3Com, AMD, ATT, Compaq, Conexant, IBM, Intel, and Lucent, allows data to be transmitted between computers or between computers and peripherals on the conventional household telephone wiring 20. The Home PNA signals are transmitted in a frequency band that is separate from telephone voice signals and DSL data signals. According to current specifications, telephone voice signals occupy a frequency band between 0.1–4 kHz. DSL data is transmitted in one direction from a user to a central location in a band from 85–95 kHz and from a central location to a user in a band from 100–500 kHz. Home PNA signals are currently specified to be transmitted in the frequency range from 5.5–9.5 MHz.

In order to receive DSL, Home PNA, and conventional analog modem signals, all on conventional telephone wiring, a computer system 40 typically may contain as many as three interface cards 42, 44, 45 which filter out the signals of interest and provide them to a central processing unit 46 or other computer components. The interface cards 42, 44, 45 include analog filter components which are expensive, bulky and difficult to align during the manufacturing process. Furthermore, each interface card typically occupies an individual slot on a computer system, thereby reducing the ability of the computer to support other cards. In addition, if the computer is to be able to transmit data over a conventional telephone network, a telephone modem card would also be required.

To eliminate the need for multiple cards required in order to transmit and receive data from conventional telephone circuitry according to different protocols, one embodiment of the present invention is a combined interface card 100 as shown in FIG. 3. The interface 100 comprises an isolation circuit 102 which preferably comprises an optoisolator that prevents the high voltages required to generate telephone signals on the household telephone wiring circuit 20 from reaching the connected computer system 40. The isolation circuit 102 feeds an analog-to-digital/digital-to-analog converter 104. The analog-to-digital/digital-to-analog converter 104 converts the analog signals received from the isolation circuit 102 to corresponding digital values and vice versa. Connected to the analog-to-digital/digital-to-analog converter 104 is a digital splitter/combiner 106. The digital splitter/combiner is a single integrated digital signal processing circuit or set of discrete logic circuits that operate to digitally filter the digital signals received from the analog-to-digital/digital-to-analog converter 104. In the presently preferred embodiment of the invention, the digital splitter/processor 106 filters the digital signals from three frequency bands. Digital signals in the telephone voice signal band are supplied to a PCM modem circuit 108. Signals in the DSL frequency band are supplied to DSL circuitry 110 that the computer uses to send and receive DSL signals. Finally, signals in the Home PNA frequency band are transmitted to a Home PNA circuitry 112 that the computer system uses to transmit and receive signals to other computers or peripherals on the Home PNA network. The details of the PCM modem, DSL circuitry, and Home PNA circuitry are considered known to those of ordinary skill in the computer communication arts.

In the reverse direction, the digital splitter/combiner 106 may receive digital signals from the Home PNA circuitry 112, DSL circuitry 110, and PCM Modem circuit 108 and combine the signals for supply to the digital-to-analog/analog-to-digital converter 104.

The advantage of using a digital splitter/processor 106 is that most or all analog components are eliminated to perform the filtering. Therefore, the interface circuit 100 can be manufactured on a single card and used in a computer to communicate in three different frequency bands. Because digital filtering is used, no bulky analog components are required and manufacturing is simplified because the components do not need to be aligned. Given the description of the frequency bands in which the signals are to be filtered, the details of the digital splitter/combiner 106 are considered to be well known to those of ordinary skill in the art. For example, U.S. Pat. No. 5,889,856, to O'Toole, illustrates the design of a digital splitter that filters digital signals in two frequency bands.

As can be seen from the above, the present invention is a single interface card that allows a computer system to communicate in multiple frequency bands over existing household wiring without the use of bulky and expensive analog filter components.

The embodiments of the invention in which an exclusive property or privilege is claimed are defined as follows:

1. An interface card for transmitting and receiving digital data signals between a computer located in a residence and residential telephone wiring, comprising:

an analog-to-digital converter for receiving analog data signals from the residential telephone wiring and converting the analog data signals to corresponding digital data signals for use in the computer in the residence; and a digital splitter that filters the digital data signals in a number of frequency bands, including a Home PNA frequency band, a DSL frequency band and a voice frequency band, and supplies the digital signals in the Home PNA frequency band, the DSL frequency band and the voice frequency band to communication circuits in the computer in the residence that transmit and receive Home PNA signals, DSL signals and data signals, respectively.

2. The interface card of claim 1, further comprising a digital combiner that combines a number of frequency bands, including the Home PNA frequency band, the DSL frequency band and the voice frequency band, into a single digital data signal; and a digital to analog converter for converting the single digital data signal into an analog data signal for transmission on the residential telephone wiring.

3. A method of interfacing a computer system located in a residence to a residential telephone communication link in order to transmit and receive digital data in a number of frequency bands, comprising:

converting analog data signals received from the residential telephone communication link and having frequencies in a number of frequency bands into a combined digital data signal for use in the computer in the residence;

supplying the combined digital data signal to a digital filter in the computer in the residence that filters components in each of the frequency bands; and supplying the components in each of the frequency bands to corresponding communication circuits in the computer in the residence that transmit and receive data in the frequency bands.

4. The method of claim 3, wherein the filter filters components in a Home PNA frequency band, a DSL frequency band and a voice frequency band.

5. A computer system in a residence, comprising:

a central processing unit;

communication circuits connected to the central processing unit that transmit and receive Home PNA signals, DSL signals and data signals; and an interface card for transmitting and receiving digital data signals between the central processing unit and residential telephone wiring, the interface card comprising an analog-to-digital converter for receiving analog data signals from the residential telephone wiring and converting the analog data signals to corresponding digital data signals for use in the central processing unit, and a digital splitter that filters the digital data signals in a number of frequency bands, including a Home PNA frequency band, a DSL frequency band and a voice frequency band, and supplies digital signals in the Home PNA frequency band, the DSL frequency band and the voice frequency band to the central processing unit for use by the communication circuits.

6. The computer system of claim 5, wherein the interface card further comprises a digital combiner that combines a number of frequency bands, including the Home PNA frequency band, the DSL frequency band and the voice frequency band, into a single digital data signal; and a digital to analog converter for converting the single digital data signal into an analog data signal for transmission on the residential telephone wiring.

7. A residence having a system for transmitting and receiving digital data signals, comprising:

residential telephone wiring;

a computer system including a central processing unit and communication circuits that transmit and receive Home PNA signals, DSL signals and data signals, the computer system located in the residence and coupled to the residential telephone wiring; and an interface card in the computer system, the interface card comprising an analog-to-digital converter for receiving analog data signals from the residential telephone wiring and converting the analog data signals to corresponding digital data signals for use in the central processing unit, and a digital splitter that filters the digital data signals in a number of frequency bands, including a Home PNA frequency band, a DSL frequency band and a voice frequency band, and supplies digital signals in the Home PNA frequency band, the DSL frequency band and the voice frequency band to the central processing unit for use by the communication circuits.

8. The residence of claim 7, wherein the interface card further comprises a digital combiner that combines a number of frequency bands, including the Home PNA frequency band, the DSL frequency band and the voice frequency band, into a single digital data signal; and a digital to analog converter for converting the single digital data signal into an analog data signal for transmission on the residential telephone wiring.

* * * * *